(12) United States Patent
Ettorre et al.

(10) Patent No.: US 11,286,867 B2
(45) Date of Patent: Mar. 29, 2022

(54) GAS TURBINE ENGINE FUEL CONTROL SYSTEM AND METHOD

(71) Applicant: GE Avio S.r.l., Rivalta di Torino (IT)

(72) Inventors: Stefano Ettorre, Bari (IT); Pierpaolo Forte, Villanova d'Asti (IT); Giuseppe Donini, Noicattaro (IT)

(73) Assignee: GE Avio S.r.l., Rivalta di Torino (IT)

( * ) Notice: Subject to any disclaimer, the term of this patent is extended or adjusted under 35 U.S.C. 154(b) by 289 days.

(21) Appl. No.: 16/479,797

(22) PCT Filed: Jan. 19, 2018

(86) PCT No.: PCT/EP2018/051363
§ 371 (c)(1),
(2) Date: Jul. 22, 2019

(87) PCT Pub. No.: WO2018/134378
PCT Pub. Date: Jul. 26, 2018

(65) Prior Publication Data
US 2021/0277837 A1 Sep. 9, 2021

(30) Foreign Application Priority Data
Jan. 20, 2017 (EP) .................................. 17425003

(51) Int. Cl.
*F02C 9/30* (2006.01)
(52) U.S. Cl.
CPC ............ *F02C 9/30* (2013.01); *F05D 2220/32* (2013.01); *F05D 2270/05* (2013.01); *F05D 2270/309* (2013.01)
(58) Field of Classification Search
CPC .... F02C 9/30; F05D 2220/32; F05D 2270/04; F05D 2270/05; F05D 2270/44; F05D 2270/101; F05D 2270/309
See application file for complete search history.

(56) References Cited

U.S. PATENT DOCUMENTS 3,309,868 A * 3/1967 Downing ................ B64C 27/12
60/791
4,912,642 A 3/1990 Larsen et al.
(Continued)

FOREIGN PATENT DOCUMENTS

CN 101981294 A 2/2011
EP 0306064 A2 3/1989
(Continued)

OTHER PUBLICATIONS

European Search Report Corresponding to EP174250035 dated Jul. 27, 2017.
(Continued)

*Primary Examiner* — Jesse S Bogue
*Assistant Examiner* — Loren C Edwards
(74) *Attorney, Agent, or Firm* — Fitch, Even, Tabin & Flannery, LLP (57) ABSTRACT

In a fuel control system (10) for a gas turbine engine (1) having a gas generator (4) and a turbine (6) driven by the gas generator (4): a main fuel regulator (12) determines a demand ($W_f$dem) of fuel flow ($W_f$) to be introduced in the gas turbine engine (1), based on an input request (PLA); and a first limiter stage (14), operatively coupled to the main fuel regulator (12), causes an adjustment of the fuel flow ($W_f$) based on engine safety operating limits. The first limiter stage (14) is provided with a Ngdot limiter (20) to cause an adjustment of the fuel flow ($W_f$) when the gas generator speed rate of change ($N_g$dot) is determined to overcome acceleration/deceleration scheduled safety limits; the Ngdot limiter (20) implements a predictor (23), to perform a prediction ($\widetilde{W_f\text{dot}}$) of the fuel flow rate of change ($W_f$dot), or fuel flow ($W_f$), allowing the gas generator speed rate of change ($N_g$dot) to track a scheduled reference value ($Ngdot_{ref}$).

13 Claims, 4 Drawing Sheets

(56) References Cited

U.S. PATENT DOCUMENTS

| | | | |
|---|---|---|---|
| 5,029,441 A | 7/1991 | Parsons | |
| 6,715,277 B2 | 4/2004 | Zagranski et al. | |
| 2004/0093151 A1* | 5/2004 | Zagranski | F02C 9/28 |
| | | | 701/104 |
| 2010/0035539 A1 | 2/2010 | Yoshida et al. | |

FOREIGN PATENT DOCUMENTS

| | | |
|---|---|---|
| EP | 1312780 A2 | 5/2003 |
| EP | 2449008 A1 | 5/2012 |
| EP | 2249008 B1 | 7/2019 |

OTHER PUBLICATIONS

PCT Written Opinion Corresponding to PCT/EP2018/051363.
PCT Interntional Search Report Corresponding to PCT/EP2018/051363 dated Apr. 17, 2018.

\* cited by examiner

GAS TURBINE ENGINE FUEL CONTROL SYSTEM AND METHOD

PRIORITY CLAIM

This application claims priority from European Patent Application No. 17425003.5 filed on Jan. 20, 2017, the disclosure of which is incorporated by reference.

TECHNICAL FIELD

The present solution relates to a system for controlling fuel flow in a gas turbine engine and to a corresponding method.

BACKGROUND ART

Fuel control systems for gas turbine engines are generally configured to determine a right amount of fuel to be supplied to the engine in order to satisfy an input power demand (e.g. originated from the pilot's power lever), without overcoming engine physical limits, such as the "stall" and "flameout" limits.

One of the main quantities that is required to be limited during engine operations is the acceleration/deceleration of the gas generator (the so called "Ngdot" quantity).

The acceleration/deceleration limitation is achieved by a so-called "Ngdot limiter", i.e. a closed loop control stage, which is part of the engine control system and intervenes, by taking control of the engine, when the actual gas generator speed rate of change is reaching its operating limits, e.g. the stall or flameout limits. Once the gas generator rate of change is far enough from these limits, the engine control is taken back by the main controller of the engine control system (e.g. a torque controller for turboprop engines or a speed controller for turbofan engines).

Some of the main tasks of the Ngdot limiter are the following:
 preventing an excessive reduction of the compressor stall margin in case of a fast acceleration request (so called "re-slam");
 achieving a consistent acceleration time; and
 providing an adequate stability margin of the combustion chamber flame, avoiding flameout in case of a fast deceleration request.

The general goal of the Ngdot limiter is to maximize the tracking performance, in order to reduce the safety margins (e.g. stall/flameout margins) and, as a consequence, fully exploit the engine capabilities; "tracking" is a measure of how close is the actual gas generator speed rate of change to the maximum allowed acceleration/deceleration, when the Ngdot limiter takes control of the engine.

One of the main design challenges related to the Ngdot limiter is to implement a controller able to track the non-linear behavior of the engine.

Known engine control systems rely on linear regulators and limiters running in parallel; the active regulator/limiter (i.e. the regulator/limiter that actually controls the engine) is selected through a so-called "priority selection scheme" and engine non-linearity is accounted for by regulator gain-scheduling.

Even if gain-scheduling linear architecture provides satisfactory results for many applications, it has been proven to exhibit limited tracking capabilities in the limitation of gas generator acceleration/deceleration. Furthermore, regulator/limiter gain-scheduling may not be enough to satisfactorily deal with the non-linear behavior of the engine.

In particular, although computationally fast and hence indicated for a real time control system, describing the engine dynamics by a set of linear models in all areas and operating conditions may lead to errors and a lack of accuracy in tracking the engine gas generator speed rate of change.

Poor acceleration/deceleration tracking during gas generator speed rate of change limitation means that the Ngdot limiter is not able to fully limit the gas generator speed rate of change below the safety limits (e.g. allowing overshoots/oscillations with respect to the limit), and, in any case, that errors may occur between the desired and the actual speed rate of change.

Therefore, in order to avoid damage and faults, engine designers have to keep higher margins from the critical safety regions (e.g. surge and flameout regions), therefore not fully exploiting the engine capabilities.

DISCLOSURE OF INVENTION

The aim of the present solution is to provide improved tracking performance of a Ngdot limiter, in order to overcome the drawbacks discussed above.

According to the present solution, a gas turbine engine control system and method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

As will be discussed in detail, the present solution envisages use of a predictor for the estimation of a quantity associated with the fuel flow (i.e. the same fuel flow, or the fuel flow rate of change) based on an engine "piecewise linear dynamic model"; according to a further aspect, the present solution envisages use of an additional regulator, operatively coupled to the predictor, in order to compensate for possible predictor uncertainties.

This solution overcomes the known limitations of linear gain-scheduled architecture in effectively limiting the gas generator speed rate of change to its maximum/minimum scheduled limits, by introducing a non-linear predictor, whose aim is to foresee the amount of fuel flow rate of change (or fuel flow rate) allowing to track and match the acceleration/deceleration limits, when the Ngdot limiter is the active controller in the engine control system.

Figure 1:
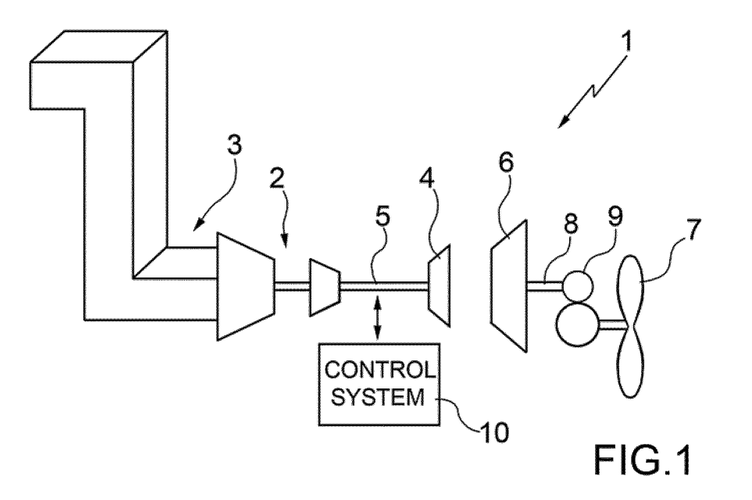
FIG. 1 is a schematic diagram of a gas turbine engine.

The present solution is applied to a gas turbine engine 1, in particular for an aircraft; as schematically shown in FIG. 1, gas turbine engine 1 generally comprises:

an axial/centrifugal compressor 2, coupled to an air intake 3;

a high-pressure turbine, so called "gas generator" 4, coupled to the axial/centrifugal compressor 2 via a compressor shaft 5;

a low-pressure turbine, so called "power turbine" 6, driven by, and mechanically decoupled from, the gas generator 4; and a propeller 7, coupled to the power turbine 6 via a power shaft 8 and suitable gearing 9.

The gas turbine engine 1 further includes a control system 10, including an electronic control unit (e.g. a microprocessor, a microcontroller, or similar electronic processing unit) provided with a non-volatile memory storing suitable software instructions, in order to perform the engine control method (as discussed in detail in the following paragraphs).

In particular, control system 10 receives measures of a plurality of engine quantities from sensors (here not shown) coupled to the gas turbine engine 1, in order to perform the control method, among which:

gas generator torque Q;
compressor variable geometry position $V_g$;
compressor variable geometry position, at steady state $V_g^{ss}$;
core engine speed $N_g$ (i.e. speed of the gas generator 4);
power turbine/propeller speed $N_p$;
compressor inlet temperature $\eta_2$;
compressor inlet pressure $\delta_2$; and
air speed CAS.

Figure 2:
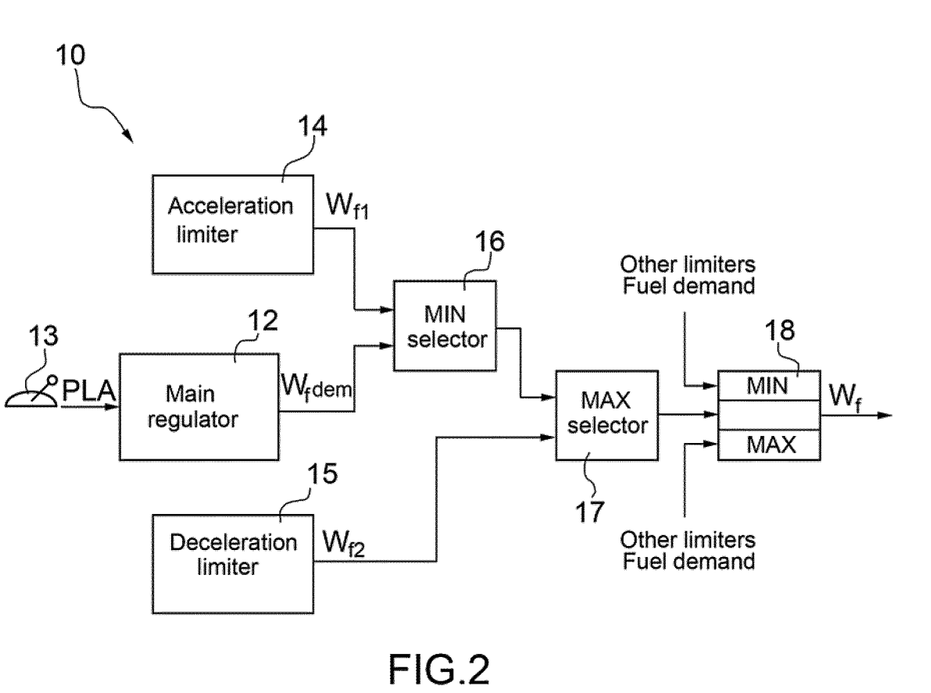
FIG. 2 is a schematic block diagram of a control system of the gas turbine engine.

As schematically shown in FIG. 2, the control system 10 comprises:

a main fuel regulator stage 12, receiving a signal PLA indicative of an input power request, in particular of the angle, or setting, of pilot's power lever 13, and configured to determine a corresponding demanded fuel flow $W_f$dem;

a first Ngdot limiter stage 14, configured to limit the acceleration of the gas generator 4 based on engine safety limits, and to determine a first limited fuel flow $W_{f1}$ allowing to track the engine acceleration limits;

a second Ngdot limiter stage 15, configured to limit the deceleration of the gas generator 4 based on engine safety limits, and to determine a second limited fuel flow $W_{f2}$ allowing to track the engine deceleration limits;

a first priority selector stage 16, in particular a minimum selector, coupled to the first Ngdot limiter stage 14 and the main fuel regulator stage 12 and configured to determine a minimum between the demanded fuel flow $W_f$dem and the first limited fuel flow $W_{f1}$ (in other words, the fuel flow at the output from the first priority selector stage 16 is either the demanded fuel flow $W_f$dem, in case the same demanded fuel flow $W_f$dem is lower than the first limited fuel flow $W_{f1}$, or the first limited fuel flow $W_{f1}$, in case the first limited fuel flow $W_{f1}$ is lower than the demanded fuel flow $W_f$dem); and a second priority selector stage 17, in particular a maximum selector, coupled to the first priority selector stage 16 and the second Ngdot limiter stage 15 and configured to determine a maximum between the second limited fuel flow $W_{f2}$ and the fuel flow at the output from the first priority selector stage 16.

As shown in FIG. 2, control system 10 may comprise a further priority selector stage 18, receiving the fuel flow at the output from the second priority selector stage 17 and comparing it, according to a minimum and maximum priority scheme, with further fuel flow demands, depending, in a known manner (here not discussed in detail) on further limitations of the engine (such as a limitation on the compressor delivery pressure or the propeller torque).

The actual fuel flow $W_f$ at the output of the control system 10 (in the example, at the output of the further priority selector stage 18) represents the actual fuel flow that it is determined to be delivered to the gas turbine engine 1 in order to meet the pilot's demand and the engine safety limits.

The present solution envisages a particular and advantageous implementation for a Ngdot limiter 20, used in the control system 10 of FIG. 2 both for the first and the second Ngdot limiter stages 14, 15. As will now be detailed, Ngdot limiter 20 is configured for optimized tracking of scheduled Ngdot values, which are designed to preserve the engine operating limits, during gas generator rate of change limitation.

The present solution overcomes the linear gain-scheduled architecture drawbacks in effectively limiting the gas generator speed rate of change to its maximum allowed value, by introducing a non-linear predictor, whose aim is to foresee the amount of fuel flow rate of change (or fuel flow), to match the acceleration/deceleration limits, when the Ngdot limiter is the active controller.

In particular, the predictor is based on the concept of a "Piecewise linear dynamic model". The idea of a piecewise linear model derives from the nature itself of the system under study: an aero engine is a non-linear non-stationary plant.

A "piecewise linear dynamic model" represents a compromise between different needs: it combines the computational efficiency of linear models with the accuracy of non-linear models. It includes non-linear static characteristics derived from a detailed performance-based static model of the gas turbine engine 1, and a set of linear coefficients describing the engine dynamics around steady-state conditions.

The prediction model itself may not be enough to guarantee the required tracking performance during gas generator rate of change limitation. This is due to the fact that the prediction model is an approximation of the actual engine behavior. To overcome this possible limitation, an additional feedback regulator may run in parallel to the prediction model. Their outputs are then summed together to provide the limited fuel flow rate.

Since the prediction model is generally accurate enough, the role of the feedback regulator is to correct the uncertainties of the model, on the basis of the difference between the maximum allowed acceleration/deceleration and the actual gas generator speed rate of change. The feedback regulator can be designed as a fixed-gains linear controller. Anyway, gain scheduling on the feedback regulator may further increase the tracking performance.

Figure 3:
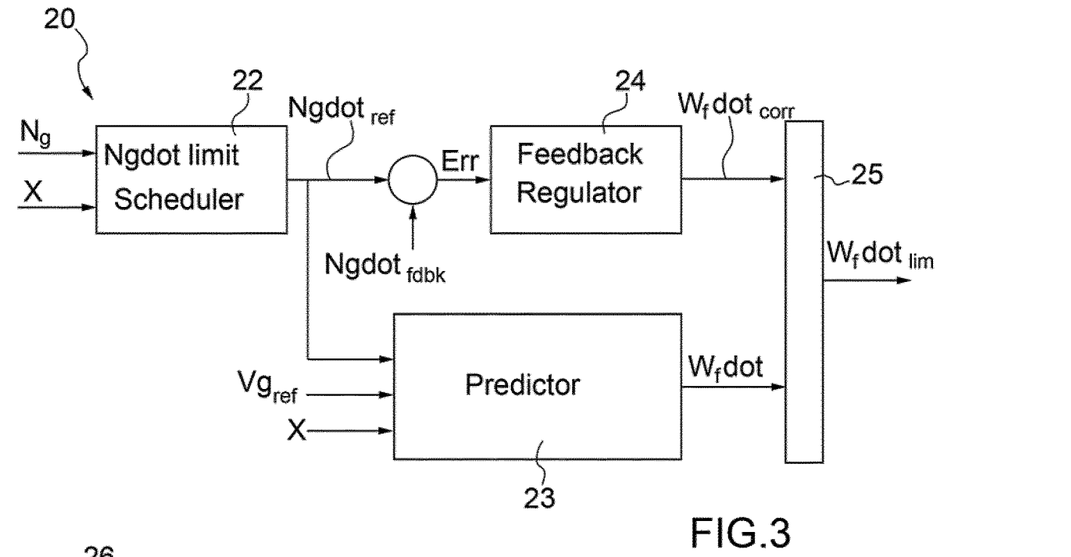
FIG. 3 is a schematic block diagram of a Ngdot limiter in the gas turbine engine control system.

In more detail, and with reference to FIG. 3, Ngdot limiter 20 comprises:

a Ngdot limit scheduler 22, of a known type (here not discussed in detail), configured to provide scheduled Ngdot reference values $Ngdot_{ref}$, according to a designed schedule (typically provided by the engine manufacturer) and based on measured values for the gas generator speed $N_g$, and an actual state x of the gas turbine engine 1 (as will be discussed, state x is represented by a number of engine parameters);

a predictor 23, coupled to the Ngdot limit scheduler 22 to receive the scheduled Ngdot reference value $Ngdot_{ref}$, and configured, in the shown embodiment, to determine a prediction $\overline{\dot{W}_f}$ of the fuel flow rate of change $\dot{W}_f$ (i.e. of the derivative of the fuel flow $W_f$) that allows to track the scheduled Ngdot reference value Ngdot$_{ref}$, based on the actual state x of the gas turbine engine 1 and, in the embodiment shown, a variable geometry position reference value $V_{gref}$ (i.e. a scheduled, reference value for the compressor variable geometry position $V_g$);

a feedback regulator 24, receiving an error Err between the Ngdot reference value Ngdot$_{ref}$ and a Ngdot feedback value Ngdot$_{fdbk}$, which is measured in the gas turbine engine 1 and fed-back to Ngdot limiter 20 in the control system 10, and configured to determine a corrective term $\dot{W}_f \text{dot}_{corr}$ for the fuel flow rate of change prediction $\overline{\dot{W}_f}$; and a summing stage 25, which receives the fuel flow rate of change prediction $\overline{\dot{W}_f}$ from the predictor 23 and the corrective term $\dot{W}_f \text{dot}_{corr}$ from the feedback regulator 24, and is configured to implement a sum thereof, in order to generate at the output a limited fuel flow rate of change $\dot{W}_f \text{dot}_{lim}$, which allows tracking the engine limits (and based on which the above discussed first and second limited fuel flows $W_{f1}$, $W_{f2}$ are determined).

The implementation of the predictor 23, which acts as a feedforward action in the control scheme of the Ngdot limiter 20, is now discussed in detail.

As previously discussed, predictor 23 is based on a piecewise linear model of the gas turbine engine 1, which is configured to model the non-linear behavior of the same gas turbine engine 1 by means of a piecewise linearization.

Figure 4:
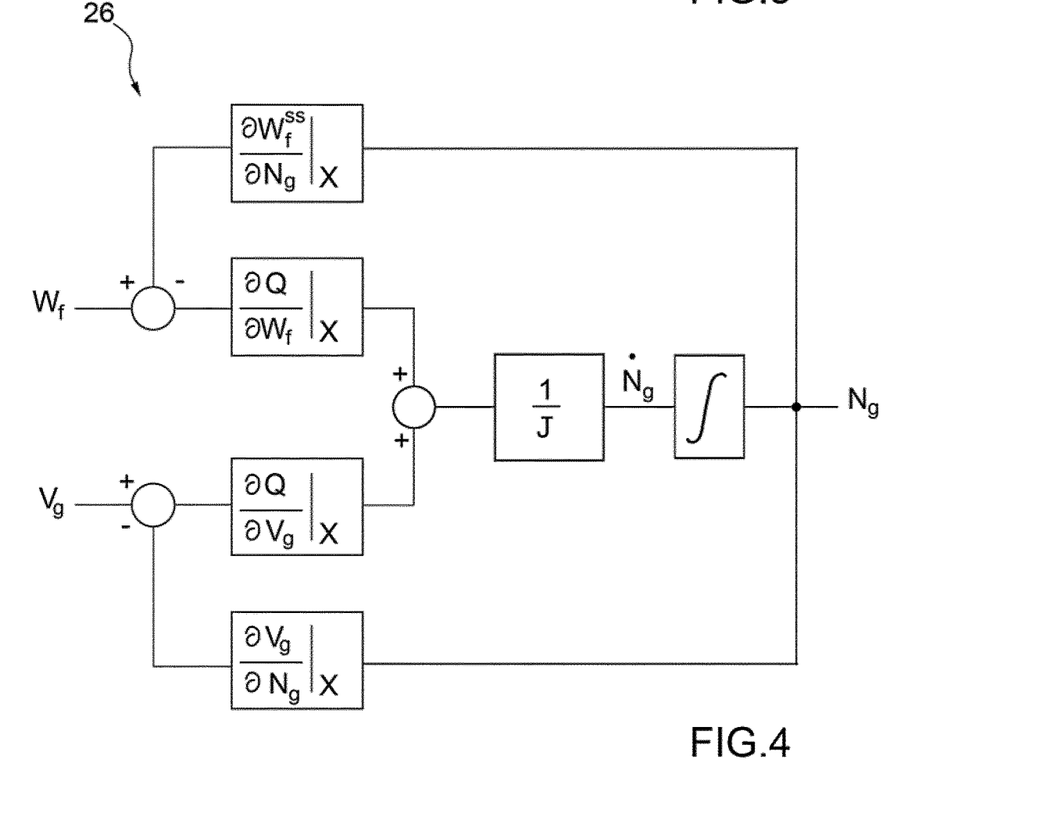
FIG. 4 shows a schematic depiction of an engine piecewise linear model on which the Ngdot limiter is based.

The scheme of the piecewise linear model, generally denoted with 26, is shown in FIG. 4, where x, representing the state of the gas turbine engine 1, is given by:

$$x=[N_g, N_p, \eta_2, \delta_2, CAS].$$

The gas turbine engine 1 may be modelled with the following expression:

$$J\dot{N}_g = \frac{\partial Q}{\partial W_f}\bigg|_x \cdot \left(W_f - \frac{\partial W_f^{SS}}{\partial N_g}\bigg|_x \cdot N_g\right) + \frac{\partial Q}{\partial V_g}\bigg|_x \cdot \left(V_g - \frac{\partial V_g^{SS}}{\partial N_g}\bigg|_x \cdot N_g\right)$$

wherein the first term is based on the fuel flow $W_f$ and the second term on the compressor variable geometry $V_g$, and J is the gas generator polar inertia.

In the above expression, terms $\partial \ldots / \partial \ldots |_x$ (e.g. the term $\partial Q / \partial W_f$ representing the change in torque induced by a change in fuel flow) are the so-called partial derivatives (or partials), which are multi-dimensional maps describing the physical behavior of the gas turbine engine 1 for any given state x. These partial derivatives may be determined from thermodynamic simulators (e.g. NPSS—Numerical Propulsion System Simulation), which are usually used to simulate the gas turbine engine 1 (and thus are commonly available), and/or from experimental measurements executed on the same gas turbine engine 1.

As previously indicated, the goal of the predictor 23 is to determine the fuel flow rate of change, which, given the actual state x of the gas turbine engine 1, causes the gas generator 4 to accelerate/decelerate according to the reference schedule.

From the above expression for the piece-wise linear model, the fuel flow term can thus be determined; in particular, considering the gas generation acceleration reference $\dot{N}_g$ref and the compressor variable geometry position reference $V_g$ref (both being dependent on the measured state x), the following expression (representing the predictor model) is obtained:

$$W_f = \left(\frac{\partial Q}{\partial W_f}\bigg|_x\right)^{-1} \cdot$$

$$\left[J\dot{N}_g ref(x) + \left(\frac{\partial Q}{\partial W_f}\bigg|_x \cdot \frac{\partial W_f^{SS}}{\partial N_g}\bigg|_x + \frac{\partial Q}{\partial V_g}\bigg|_x \cdot \frac{\partial V_g^{SS}}{\partial N_g}\bigg|_x\right) \cdot N_g - \frac{\partial Q}{\partial V_g}\bigg|_x \cdot V_g ref(x)\right]$$

Figure 5:
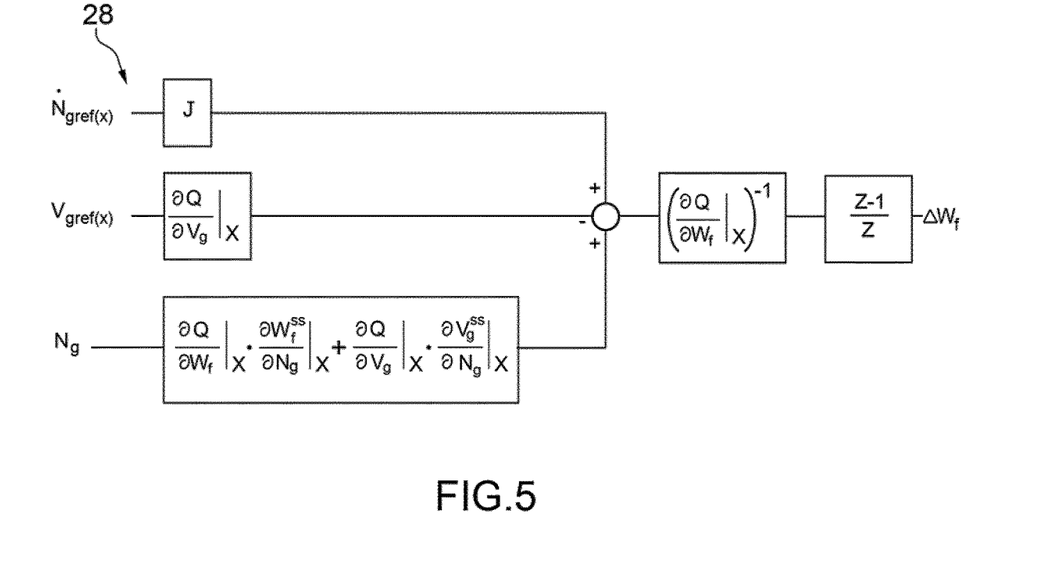
FIG. 5 shows a schematic depiction of a predictor model implemented in the Ngdot limiter.

FIG. 5 shows the scheme of the predictor model, generally denoted with 28, implementing the above expression (in the case of a discrete-time implementation, with $\Delta W_f$ being the fuel flow rate of change).

Assuming that the second term of the expression associated with the compressor variable geometry position $V_g$ may be neglected, the expression for the fuel flow rate of change $\dot{W}_f$ may be simplified as:

$$\dot{W}_f \cong \left(\frac{\partial Q}{\partial W_f}\bigg|_x\right)^{-1} \cdot J\dot{N}_g ref(x) + \frac{\partial W_f^{SS}}{\partial N_g}\bigg|_x \cdot \dot{N}_g$$

Figure 6:
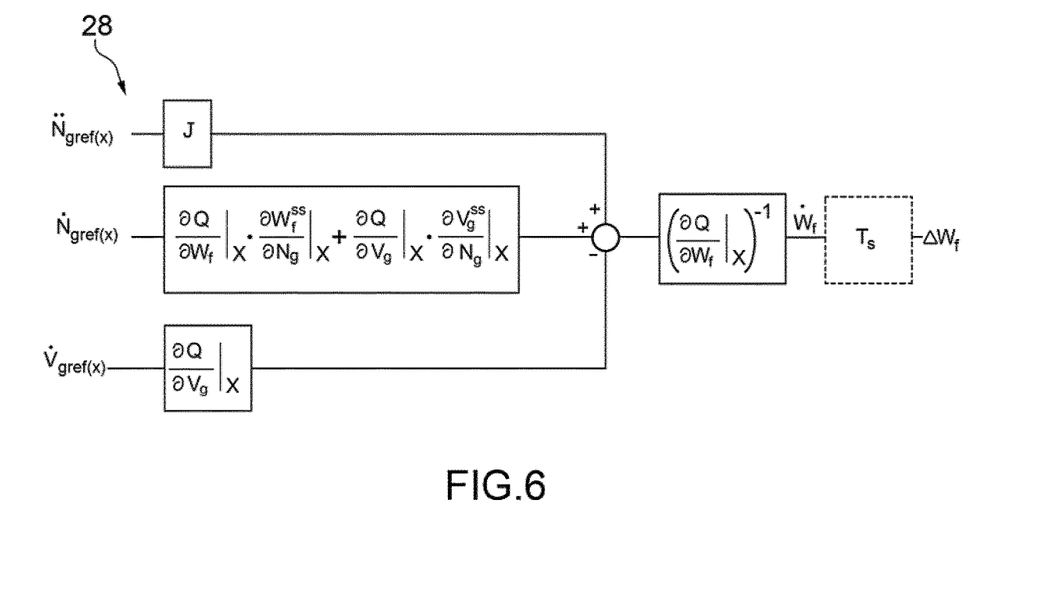
FIG. 6 shows a schematic depiction of a predictor model implemented in the Ngdot limiter, according to a different embodiment.

As an alternative, and again referring to the above expression for the predictor model, assuming the terms $\partial \ldots / \partial \ldots |_x$ as being constant (in order to simplify the model), the following expression for the fuel flow rate of change $\dot{W}_f$ may be derived:

$$\dot{W}_f = \left(\frac{\partial Q}{\partial W_f}\bigg|_x\right)^{-1} \cdot$$

$$\left[J\ddot{N}_g ref(x) + \left(\frac{\partial Q}{\partial W_f}\bigg|_x \cdot \frac{\partial W_f^{SS}}{\partial N_g}\bigg|_x + \frac{\partial Q}{\partial V_g}\bigg|_x \cdot \frac{\partial V_g^{SS}}{\partial N_g}\bigg|_x\right) \cdot \dot{N}_g - \frac{\partial Q}{\partial V_g}\bigg|_x \cdot \dot{V}_g ref(x)\right]$$

FIG. 6 shows the scheme of the predictor model, again denoted with 28, implementing the above alternative expression (in the case of a discrete-time implementation, the fuel flow rate of change $\dot{W}_f$ is multiplied by the sampling time $T_s$, in order to determine $\Delta W_f$).

In general, and as will be evident to a skilled person, the output of the predictor 23 will be the fuel flow $W_f$, or the fuel flow rate of change $\dot{W}_f$, depending on the output of the engine regulators/limiters controlling the gas turbine engine 1.

As will be apparent to a person skilled in the field, the predictor 23 may be digitally implemented in the electronic control unit of the control system 10 in several ways:

directly implementing the above discussed expression for the predictor model 28;

by means of a look-up table stored in the associated non-volatile memory, in which a set of values computed from the same expression are stored and interpolated; or by means of approximating functions, such as a set of polynomials.

Figure 7A:
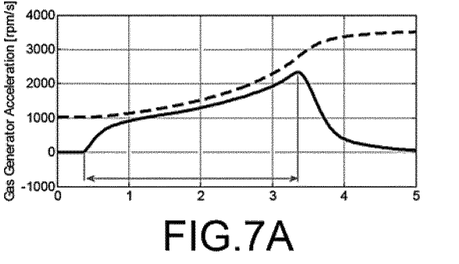
FIGS. 7A-7B and 8A-8B show plots related to tracking performance of the proposed solution (FIGS. 7B and 8B) with respect to a state-of-the-art solution (FIGS. 7A and 8A).
Figure 7B:
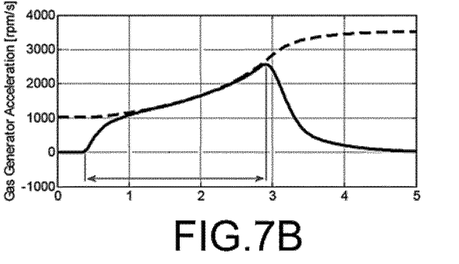
Figure 8A:
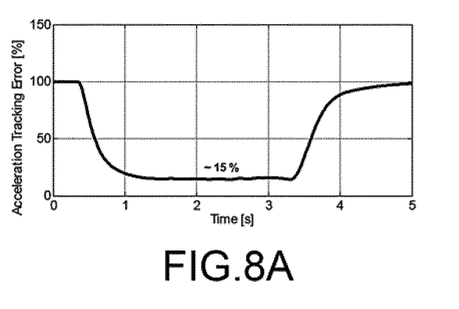

A comparison between the tracking performance of the proposed solution and of a state-of-the-art solution, in which a gain scheduled linear regulator is adopted, is shown in FIGS. 7A, 8A (showing the tracking performance of the prior art solution) and 7B, 8B (showing the tracking performance of the present solution).

Figure 8B:
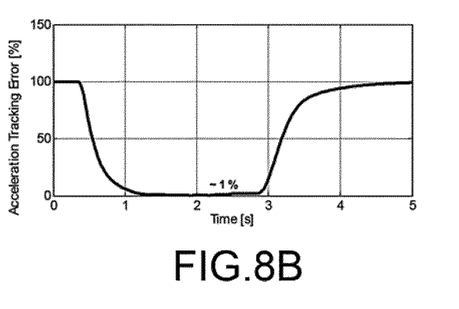

In particular, FIGS. 7A, 7B show the gas generator acceleration plot (shown with solid lines) with respect to a scheduled acceleration limit (shown with dashed line), when the Ngdot limiter 20 takes control of the gas turbine engine 1 (time interval denoted with the double arrow); FIGS. 8A, 8B show the corresponding acceleration tracking error.

In the example shown, the tracking error of the present solution is one order of magnitude lower than the corresponding tracking error of the prior art solution (about 1% in the present solution, against a value of about 15% for the prior art solution).

The advantages of the present solution are clear from the previous discussion.

In particular, it is again underlined the tracking performance improvement of the Ngdot limiter 20 with respect to prior art solutions, leading to a very good acceleration/deceleration tracking, allowing for low margins from the surge and flameout regions and exploitation of full engine capabilities during acceleration/deceleration manoeuvers.

Moreover, an additional benefit of the proposed solution is the ability to easily tune the Ngdot limiter 20 for different engines or applications.

Indeed, the parameters of the predictor 23 can be easily derived from a thermodynamic model of the engine (e.g. a NPSS model) that is usually generated during the development of a new engine to evaluate its operability and performance capabilities. It is worth noticing that the same data can be inferred from experimental campaigns on the actual engine. Since the feedback regulator 24 is only used to correct predictor errors, also the same feedback regulator 24 will require minor gain-tuning to fit for the new engine applications.

This feature makes the engine-to-engine scalability particularly easy with respect to state of the art solutions, in which, instead, the linear gain scheduled regulators need to cover the entire engine acceleration dynamic behavior, therefore, requiring a major effort for gain tuning and scheduling activity.

In general, the following are some of the technical advantages of the discussed solution:

improved tracking performance under acceleration/deceleration limitations, leading to exploitation of full engine capabilities and minor margins from the safety regions (e.g. surge and flameout regions);

null or minor regulator gain scheduling required;

easy scalability of the predictor 23 and additional feedback regulator 24 with respect to engine design modification, or new engine introduction;

applicability to any turbine engine, in particular for aircraft; and low memory requirements for digital implementation.

Finally, it is clear that modifications and variations can be made to what is described and illustrated herein, without thereby departing from the scope of the present invention as defined in the appended claims.

In particular, as already mentioned, depending on the control scheme implemented in the control system 10, the output from the predictor 23 may be the fuel flow $W_f$, instead of the fuel flow rate of change $W_f \text{dot}$ (or $\Delta W_f$).

The model implemented by the same predictor 23 may be simplified depending on the available measures for representing the state x of the system (leading, however, to a possible worsening of the acceleration/deceleration limit tracking).

Moreover, further parameters may be used to correct the model/predictor, for example the compressor inlet pressure $\delta_2$ and/or the compressor inlet temperature $\eta_2$, in order to take into account temperature and/or altitude effects.

The invention claimed is:

1. A fuel control system for a gas turbine engine having a gas generator and a power turbine driven by the gas generator, comprising:

a main fuel regulator, configured to determine a demand ($W_f$dem) of a fuel flow ($W_f$) to be introduced in the gas turbine engine, based on an input request (PLA);

a Ngdot limiter configured to cause an adjustment to the fuel flow ($W_f$) when a speed rate of change ($N_g$dot) of the gas generator is determined to overcome a scheduled acceleration, or deceleration, engine safety operating limit, wherein the Ngdot limiter comprises a predictor, configured to perform a prediction ($\overline{W_f \text{dot}}$) of a fuel flow rate of change ($W_f$dot), or the fuel flow ($W_f$), allowing the gas generator speed rate of change ($N_g$dot) to track a scheduled reference value (Ngdot$_{ref}$); wherein the adjustment to the fuel flow ($W_f$) is based on the prediction ($\overline{W_f \text{dot}}$), and wherein the Ngdot limiter further comprises a feedback regulator, configured to provide a corrective term ($W_f \text{dot}_{corr}$) for the prediction ($\overline{W_f \text{dot}}$), based on an error (Err) between a feedback gas generator speed rate of change ($N_g \text{dot}_{fdbk}$), measured in the gas turbine engine, and the scheduled reference value (Ngdot$_{ref}$).

2. The control system according to claim 1, further comprising a summing stage, configured to execute a sum between the prediction ($\overline{W_f \text{dot}}$) and the corrective term ($W_f \text{dot}_{corr}$), to generate a limited fuel flow value ($W_f \text{dot}_{lim}$) at an output of the Ngdot limiter allowing the gas generator speed rate of change ($N_g$dot) to track the scheduled reference value (Ngdot$_{ref}$); wherein the adjustment to the fuel flow ($W_f$) is based on the limited fuel flow value ($W_f \text{dot}_{lim}$).

3. The control system according to claim 1, wherein the predictor is configured to implement a predictor model based on a piece-wise linear model of the gas turbine engine, to determine the prediction ($\overline{W_f \text{dot}}$) based on an actual state (x) of the gas turbine engine.

4. The control system according to claim 3, wherein the piece-wise linear model is based on a plurality of partial derivatives describing a physical behavior of the gas turbine engine for any given state (x) thereof; wherein the partial derivatives are determined from a thermodynamic simulator of the gas turbine engine, or experimental measurements on the gas turbine engine.

5. The control system according to claim 4, wherein the gas turbine engine further comprises a compressor coupled to the gas generator; wherein the predictor model is configured to implement the following expression:

$$W_f = \left(\frac{\partial Q}{\partial W_f}\bigg|_x\right)^{-1} \cdot$$

$$\left[J\dot{N}_g ref(x) + \left(\frac{\partial Q}{\partial W_f}\bigg|_x \cdot \frac{\partial W_f^{ss}}{\partial N_g}\bigg|_x + \frac{\partial Q}{\partial V_g}\bigg|_x \cdot \frac{\partial V_g^{ss}}{\partial N_g}\bigg|_x\right) \cdot N_g - \frac{\partial Q}{\partial V_g}\bigg|_x \cdot V_g ref(x)\right]$$

wherein:

the state (x) of the gas turbine engine is given by x=[$N_g$, $N_p$, $\theta_2$, $\delta_2$, CAS], where $N_g$ is a speed of the gas generator, $N_p$ is a speed of the power turbine, $\theta_2$ is an engine inlet temperature, $\delta_2$ is an engine inlet pressure, CAS is an air speed;

J is the polar inertia of the gas generator;

$N_g$ref is a reference value for the gas generator speed;

Q is a torque of the gas generator;

$V_g$ is a variable geometry of the compressor;

$V_g$ref is a reference value for the compressor variable geometry;

SS denotes a steady state condition.

6. A gas turbine engine, comprising the fuel control system according to claim 1.

7. The gas turbine engine according to claim 6, comprising a propeller, or turbofan, coupled to the power turbine.

8. A fuel control system for a gas turbine engine having a gas generator and a power turbine driven by the gas generator, comprising:
   a main fuel regulator, configured to determine a demand ($W_f$dem) of a fuel flow ($W_f$) to be introduced in the gas turbine engine, based on an input request (PLA);
   a Ngdot limiter configured to cause an adjustment to the fuel flow ($W_f$) when a speed rate of change ($N_g$dot) of the gas generator is determined to overcome a scheduled acceleration, or deceleration, engine safety operating limit,
   wherein the Ngdot limiter comprises a predictor, configured to perform a prediction ($\overline{W_f \text{dot}}$) of a fuel flow rate of change ($W_f$dot), or the fuel flow ($W_f$), allowing the gas generator speed rate of change ($N_g$dot) to track a scheduled reference value (Ngdot$_{ref}$); wherein the adjustment to the fuel flow ($W_f$) is based on the prediction ($\overline{W_f \text{dot}}$);
   a first limiter stage, including the Ngdot limiter, operatively coupled to the main fuel regulator to cause the adjustment of the fuel flow ($W_f$) to limit an acceleration of the gas generator, and configured to provide a first limited fuel flow ($W_{f1}$);
   a first priority selector stage, coupled to the first limiter stage and the main fuel regulator and configured to determine a minimum between the demanded fuel flow ($W_f$dem) and the first limited fuel flow ($W_{f1}$);
   a second limiter stage, including a second Ngdot limiter, operatively coupled to the main fuel regulator to limit a deceleration of the gas generator and configured to provide a second limited fuel flow ($W_{f2}$); and
   a second priority selector stage, coupled to the first priority selector stage and the second limiter stage and configured to determine a maximum between the second limited fuel flow ($W_{f2}$) and a fuel flow at an output from the first priority selector stage, as the fuel flow ($W_f$) to be introduced in the gas turbine engine.

9. A fuel control method for a gas turbine engine, having a gas generator and a turbine driven by the gas generator, comprising:
   determining a demand ($W_f$dem) of a fuel flow ($W_f$) to be introduced in the gas turbine engine, based on an input request (PLA); and
   causing an adjustment of the fuel flow ($W_f$) based on engine safety operating limits, when a speed rate of change ($N_g$dot) of the gas generator is determined to overcome a scheduled acceleration, or deceleration, safety operating limit,
   determining a prediction ($\overline{W_f \text{dot}}$) of a fuel flow rate of change ($W_f$dot), or the fuel flow ($W_f$), allowing the gas generator speed rate of change ($N_g$dot) to track a scheduled reference value (Ngdot$_{ref}$); wherein the adjustment to the fuel flow ($W_f$) is based on the prediction ($\overline{W_f \text{dot}}$), and
   providing a corrective term ($W_f \text{dot}_{corr}$) for the prediction ($\overline{W_f \text{dot}}$), based on an error (Err) between a feedback gas generator speed rate of change ($N_g \text{dot}_{fdbk}$), measured in the gas turbine engine, and the scheduled reference value (Ngdot$_{ref}$).

10. The control method according to claim 9, further comprising executing a sum between the prediction ($\overline{W_f \text{dot}}$) and the corrective term ($W_f \text{dot}_{corr}$), to generate at an output a limited fuel flow value ($W_d \text{dot}_{lim}$) allowing the gas generator speed rate of change ($N_g$dot) to track the scheduled reference value (Ngdot$_{ref}$); wherein the adjustment to the fuel flow ($W_f$) is based on the limited fuel flow value ($W_f \text{dot}_{lim}$).

11. The control method according to claim 9, wherein determining the prediction includes implementing a prediction model based on a piece-wise linear model to determine the prediction ($\overline{W_f \text{dot}}$), based on an actual state (x) of the gas turbine engine.

12. The control method according to claim 11, wherein the piece-wise linear model is based on a plurality of partial derivatives describing a physical behavior of the gas turbine engine for any given state (x); wherein the partial derivatives are determined from a thermodynamic simulator of the gas turbine engine, or from experimental measurements on the gas turbine engine.

13. The control method according to claim 9, wherein causing the adjustment comprises:
   determining a first limited fuel flow ($W_{f1}$) to limit an acceleration of the gas generator;
   determining a minimum between the demanded fuel flow ($W_f$dem) and the first limited fuel flow ($W_{f1}$);
   determining a second limited fuel flow ($W_{f2}$) to limit a deceleration of the gas generator; and
   determining a maximum between the second limited fuel flow ($W_{f2}$) and a fuel flow at an output from a first priority selector stage as the fuel flow ($W_f$) to be introduced in the gas turbine engine.

* * * * *

UNITED STATES PATENT AND TRADEMARK OFFICE
CERTIFICATE OF CORRECTION

| | | |
|---|---|---|
| PATENT NO. | : 11,286,867 B2 | Page 1 of 1 |
| APPLICATION NO. | : 16/479797 | |
| DATED | : March 29, 2022 | |
| INVENTOR(S) | : Stefano Ettorre, Pierpaolo Forte and Giuseppe Donini | |

It is certified that error appears in the above-identified patent and that said Letters Patent is hereby corrected as shown below:

In the Claims

Column 10, Line 24, in Claim 10, delete "($W_d dot_{lim}$)" and insert -- ($W_f dot_{lim}$) --

Signed and Sealed this
Fifth Day of July, 2022

Katherine Kelly Vidal
*Director of the United States Patent and Trademark Office*